(12) United States Patent
Cheshire

(10) Patent No.: US 10,305,771 B2
(45) Date of Patent: May 28, 2019

(54) PROXIMITY WI-FI

(71) Applicant: Apple Inc., Cupertino, CA (US)

(72) Inventor: Stuart D. Cheshire, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/702,829

(22) Filed: Sep. 13, 2017

(65) Prior Publication Data

US 2018/0083858 A1 Mar. 22, 2018

Related U.S. Application Data

(60) Provisional application No. 62/395,988, filed on Sep. 16, 2016.

(51) Int. Cl.

| H04L 12/26 | (2006.01) |
| H04W 72/04 | (2009.01) |
| H04W 84/12 | (2009.01) |
| H04L 29/08 | (2006.01) |
| H04W 4/80 | (2018.01) |

(52) U.S. Cl.
CPC ....... *H04L 43/106* (2013.01); *H04W 72/0446* (2013.01); *H04W 84/12* (2013.01); *H04L 67/104* (2013.01); *H04L 67/18* (2013.01); *H04W 4/80* (2018.02)

(58) Field of Classification Search
CPC .. H04L 43/106; H04W 72/0446; H04W 84/12
See application file for complete search history.

(56) References Cited

U.S. PATENT DOCUMENTS

| 2005/0286447 | A1* | 12/2005 | Coffman | H04B 7/212 |
| 2008/0273606 | A1* | 11/2008 | Orfanos | H04L 27/28 |
| 2014/0165158 | A1 | 6/2014 | Chan et al. | |
| 2014/0254426 | A1 | 9/2014 | Abraham et al. | |
| 2014/0344806 | A1* | 11/2014 | Suresh | G06F 9/45533 |
| 2015/0304986 | A1* | 10/2015 | Eriksson | H04W 68/005 |
| 2015/0351018 | A1 | 12/2015 | Kim et al. | |

FOREIGN PATENT DOCUMENTS

WO  WO 2014089252 A1  6/2014

\* cited by examiner

*Primary Examiner* — Ronald B Abelson
(74) *Attorney, Agent, or Firm* — Meyertons Hood Kivlin Kowert & Goetzel, P.C.; Jeffrey C. Hood; Brian E. Moore

(57) ABSTRACT

In embodiments, one or more wireless stations operate to configure direct communication with neighboring mobile stations, i.e., direct communication between the wireless stations without utilizing an intermediate access point. Embodiments of the disclosure relate to an architecture to implement proximity Wi-Fi communications, including, architecture design, timing and clock management, communication protocols, including discovery, device addressing, and termination, as well as security.

20 Claims, 7 Drawing Sheets

PROXIMITY WI-FI

PRIORITY DATA

This application claims benefit of priority to U.S. Provisional Application Ser. No. 62/395,988, titled "Proximity Wi-Fi", filed Sep. 16, 2016, by Stuart D. Cheshire, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Embodiments described herein relate to systems and methods for proximity Wi-Fi, e.g., systems and methods to enable Wi-Fi devices to communicate with peer Wi-Fi devices within direct radio range independent of any external infrastructure.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein. In some embodiments, one or more wireless stations operate to configure direct communication with neighboring mobile stations, i.e., direct communication between the wireless stations without utilizing an intermediate access point. Embodiments of the disclosure relate to an architecture to implement proximity Wi-Fi communications, including architecture, design, timing and clock management, communication protocols, including discovery, device addressing, and termination, as well as security.

In some embodiments, a wireless device may perform methods to (or be configured to) receive a message from a neighboring peer device via Wi-Fi peer-to-peer communication. The message may include a first timestamp value indicating time of transmission of the message and an availability time. The first timestamp and the availability time may be based on a local clock of the neighboring peer device. The wireless device may be configured to attach (or append) to the first message a second timestamp value indicating time of receipt of the first message and determine, based on comparison of the first and second timestamp values, a local time that correlates to the availability time of the neighboring peer station. The second timestamp value may be based on the local clock of the wireless device. In other words, having available near-simultaneous timestamps (e.g., the first and second timestamp values) in both the sender's (e.g., the neighboring peer device) and receiver's (e.g., the wireless device) local clocks may allow the difference in those clocks to be known and knowledge of the difference may allow time values in the message, expressed relative to the sender's clock, to be converted to time values relative to the receiver's clock. Thus, time values included in the message (e.g., availability time) may be interpreted meaningfully despite the sender's and receiver's clocks not being synchronized.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
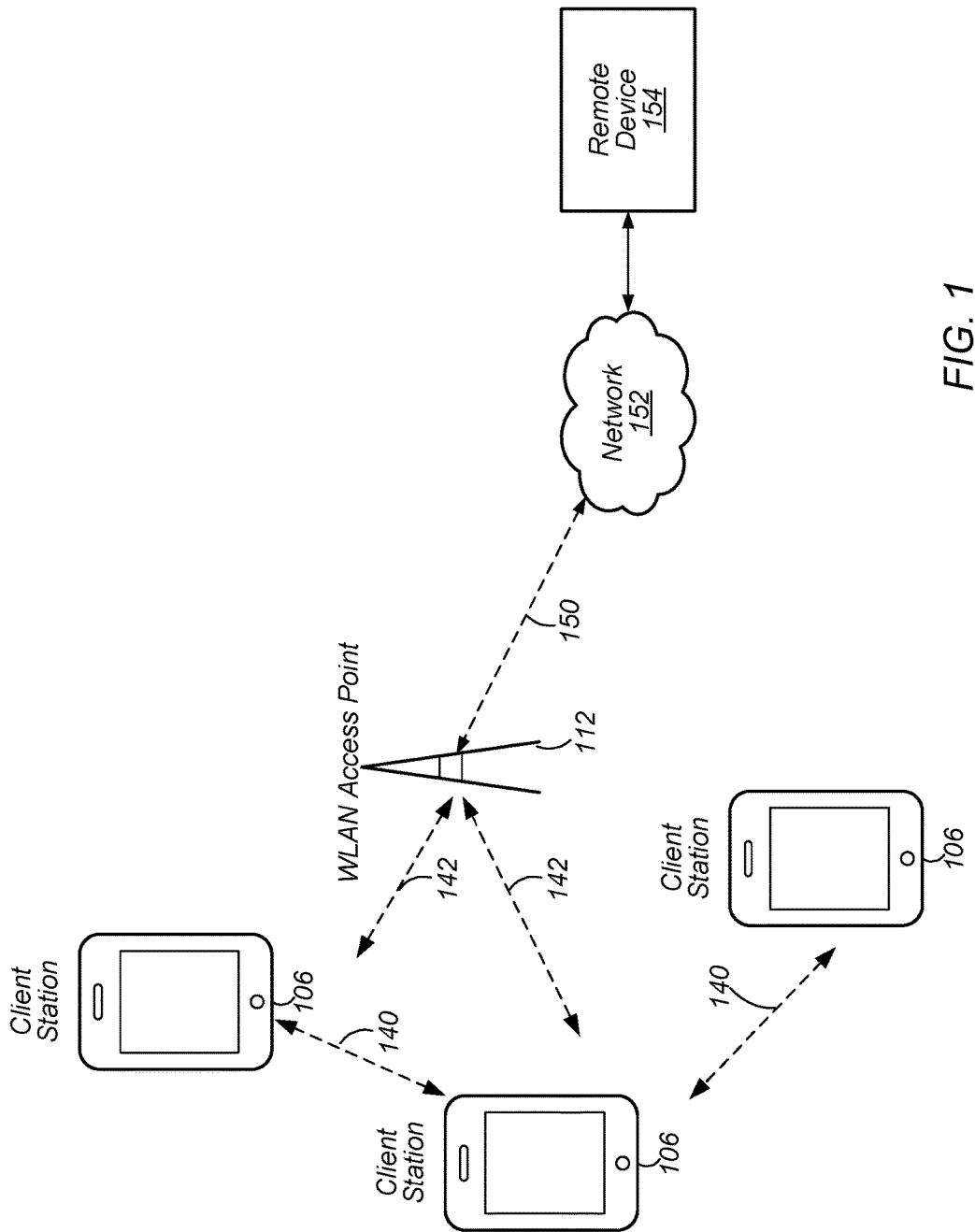
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
LAN: Local Area Network
WLAN: Wireless LAN
RAT: Radio Access Technology
TU: IEEE 802.11 time unit (1024 microseconds)

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Sever—refers to any software, running on any device, listening for incoming packets or connections. That device could be any station such as a (smart) television, a printer, a (smart) phone, or a wearable device.

Time Unit (TU)—refers to a measurement of time as defined by IEEE 802.11. In IEEE 802.11, a time unit (TU) is defined as 1.024 milliseconds, however, a TU is often approximated as 1 millisecond.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to (or perform methods to) receive a message from a neighboring peer device via Wi-Fi peer-to-peer communication. The message may include a first timestamp value indicating time of transmission of the message and an availability time. The first timestamp and the availability time may be based on a local clock of the neighboring peer device. The wireless device (e.g., receiving device) may be configured to attach (or append) to the message a second timestamp value indicating time of receipt of the first message and determine, based on comparison of the first and second timestamp values, a local time that correlates to the availability time of the neighboring peer device. The second timestamp value may be based on the local clock of the wireless device. In other words, having available near-simultaneous timestamps (e.g., the first and second timestamp values) in both the sender's (e.g., the neighboring peer device) and receiver's (e.g., the wireless device) local clocks may allow the difference in those clocks to be known and knowledge of the difference may allow time values in the message, expressed relative to the sender's clock, to be converted to time values relative to the receiver's clock. Thus, time values included in the message (e.g., availability time) may be interpreted meaningfully despite the sender's and receiver's clocks not being synchronized.

Figure 2:
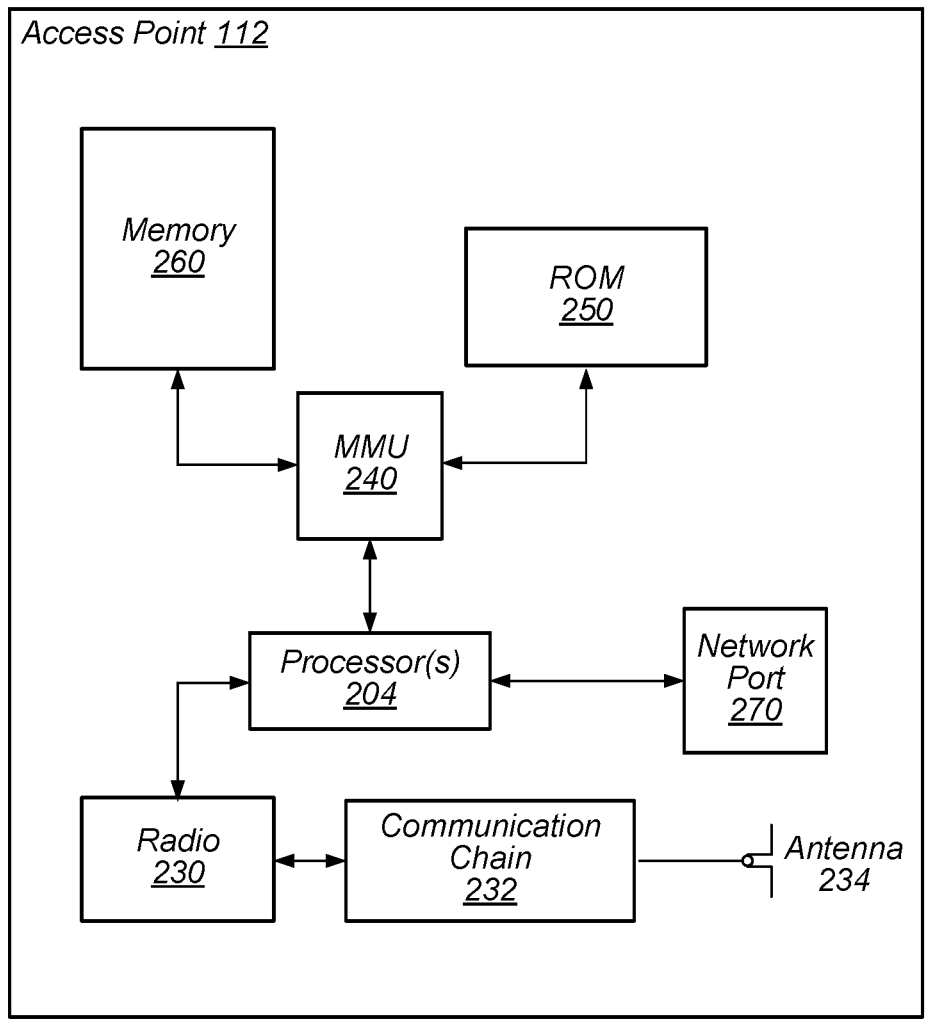
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to (or perform methods to) receive a message from a neighboring peer device via Wi-Fi peer-to-peer communication. The message may include a first timestamp value indicating time of transmission of the message and an availability time. The timestamp and the availability time may be based on a local clock of the neighboring peer device. The AP may be configured to attach (or append) to the first message a second timestamp value indicating time of receipt of the message and determine, based on comparison of the first and second timestamp values, a local time that correlates to the availability time of the neighboring peer device. The second timestamp value may be based on the local clock of the wireless station. In other words, having available near-simultaneous timestamps (e.g., the first and second timestamp values) in both the sender's (e.g., the neighboring peer device) and receiver's (e.g., the AP) local clocks may allow the difference in those clocks to be known and knowledge of the difference may allow time values in the message, expressed relative to the sender's clock, to be converted to time values relative to the receiver's clock. Thus, time values included in the message (e.g., availability time) may be interpreted meaningfully despite the sender's and receiver's clocks not being synchronized.

Figure 3:
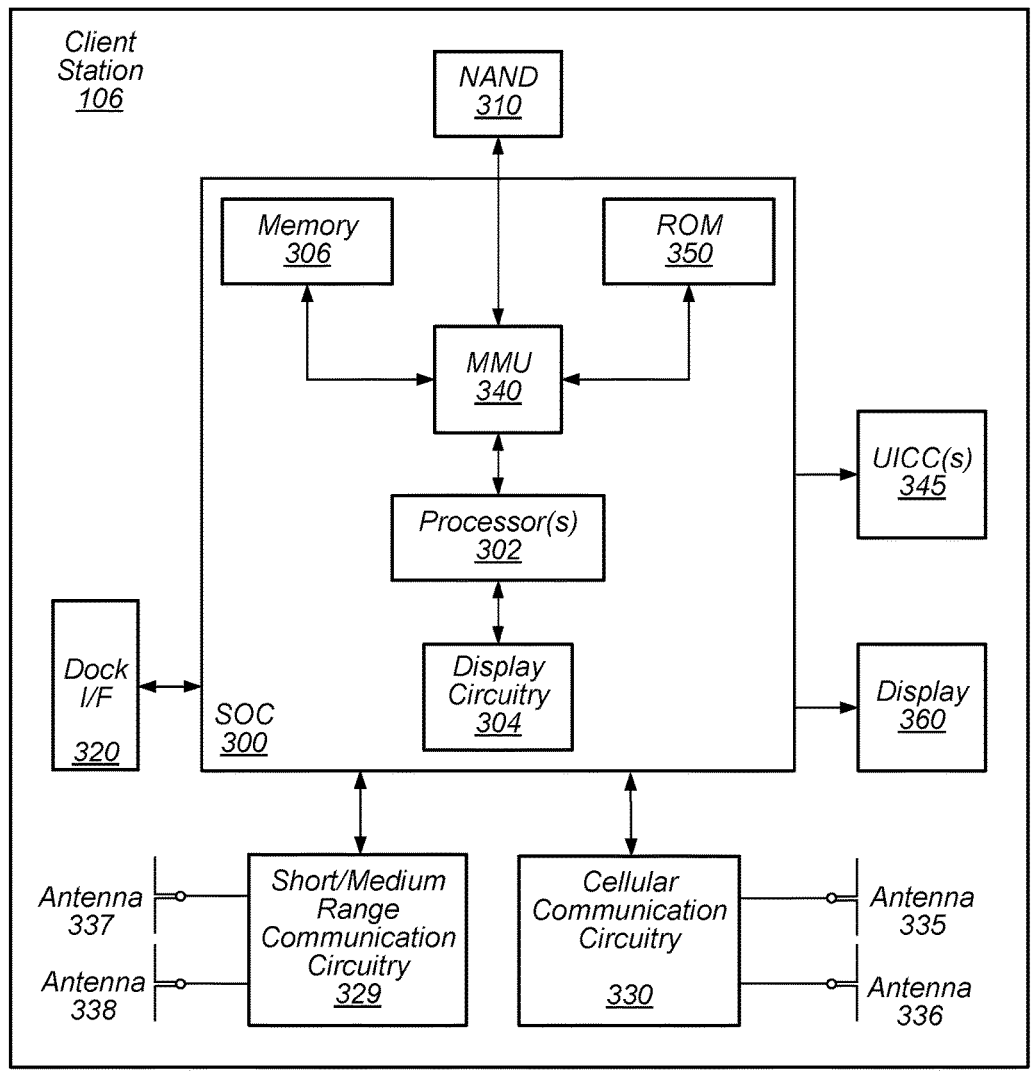
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to (or perform methods to) receive a message from a neighboring peer station via Wi-Fi peer-to-peer communication. The message may include a first timestamp value indicating time of transmission of the first message and an availability time. The timestamp and the availability time may be based on a local clock of the neighboring peer station. The client station may be configured to attach (or append) to the first message a second timestamp value indicating time of receipt of the first message and determine, based on comparison of the first and second timestamp values, a local time that correlates to the availability time of the neighboring peer station. The second timestamp value may be based on the local clock of the wireless station. In other words, having available near-simultaneous timestamps (e.g., the first and second timestamp values) in both the sender's (e.g., the neighboring peer station) and receiver's (e.g., the wireless station) local clocks may allow the difference in those clocks to be known and knowledge of the difference may allow time values in the message, expressed relative to the sender's clock, to be converted to time values relative to the receiver's clock. Thus, time values included in the message (e.g., availability time) may be interpreted meaningfully despite the sender's and receiver's clocks not being synchronized.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer-to-Peer Communication Protocols

In some implementations, Wi-Fi devices may be able to communicate with each other in a peer-to-peer manner, e.g., without the communications going through an intervening access point. There are several types of Wi-Fi peer-to-peer networking protocols. In IBSS mode (part of the IEEE 802.11 specifications), when two Wi-Fi devices (e.g., wireless stations) communicate with each other, one of the Wi-Fi devices essentially acts as a pseudo access point and the other acts as a client device. An algorithm is used to determine which device acts as a pseudo access point. In a second type of Wi-Fi peer-to-peer protocol (specified by the Wi-Fi Alliance), referred to as neighbor awareness networking (NAN), a different algorithm is used to determine which device acts as a pseudo access point.

A pre-cursor to the current Wi-Fi Alliance peer-to-peer protocols was a peer-to-peer communication based on Wi-Fi infrastructure modes—both a Basic Service Set (BSS) and a collection of BSSs operating as an Extended Service Set (ESS) are widely used for access to wider networks like the Internet and for local peer-to-peer communication such as AirPrint™ and AirPlay™. When appropriately configured, infrastructure Wi-Fi networks may facilitate peer-to-peer communication as is the case in some residential wireless networks. However, there are many cases where infrastructure Wi-Fi networks do not facilitate peer-to-peer communication.

For example, in some implementations, peers may be associated with different Wi-Fi networks offered by different access points, or associated with different virtual Wi-Fi networks offered by a single access point, e.g., an access point offering both a private network and a separate "guest" network. Often there is limited communication between these different links. Link-local discovery packets may not be forwarded between the links and network address translation (NAT) may be performed independently for the two links, further hindering peer-to-peer communication. Rectifying this situation requires the device to be aware of the different Wi-Fi network names (SSIDs) and for one or both devices to switch Wi-Fi networks. In some cases, the devices may not have, or be willing to share, the necessary Wi-Fi network passwords or credentials to enable them to join the same Wi-Fi network.

As another example, in some implementations, e.g., an enterprise network, there may be multiple access points offering the same user-visible Wi-Fi network name (SSID). In these cases, even when devices appear to be "on the same Wi-Fi network" to the users, the devices may in fact be associated with different access points, with limited communication between those access points.

As yet another example, in some implementations, e.g., a public Wi-Fi hotspot configuration, even peers associated with the same access point are intentionally prevented from communicating with one another, e.g., to limit potential spread of malware.

The previously-mentioned IBSS mode, independent BSS, as standardized by IEEE, allows for the creation of named peer-to-peer networks. In some communities, IBSS mode may be referred to as an "ad hoc" mode. Creating an IBSS network may include naming the IBSS network, selecting a radio channel for a new peer-to-peer network, and inviting other peers to join this named network. However, as currently implemented, devices joining an MSS network lose their infrastructure Wi-Fi connectivity. In addition, it is only possible to be a member of one IBSS network at a time. A further limitation (also shared with infrastructure Wi-Fi networks described above) is that there is no mechanism to discover what services are being offered on an IBSS network without joining it first.

The limitations of IBSS mode (and its Wi-Fi infrastructure predecessors) led the Wi-Fi Alliance to define Wi-Fi Direct. Further, due to concerns regarding Wi-Fi Direct, Apple Wireless Direct Link (AWDL) was developed by Apple and eventually adopted by the Wi-Fi Alliance as the basis for Neighbor Awareness Networking (NAN).

The primary design principle behind NAN is that all devices must be synchronized to a common clock. In other words, a community of mutually synchronized devices may form a closed set such that there is no overlap with any other synchronized groups of devices. However, this design principle may falter as there is no current implementation within NAN to allow a device to know reliably which devices may need to be synchronized for future communications. In addition, in an environment of growing numbers of mobile devices, synchronization between arbitrarily large numbers of mobile devices creates further issues.

Hence, embodiments described herein relate to a third type of Wi-Fi peer-to-peer networking protocol, e.g., proximity Wi-Fi, in which devices communicate via bilateral pairwise coordination of clocks rather than attempting to achieve global synchronization of clocks.

In some embodiments of proximity Wi-Fi, Wi-Fi devices (e.g., client stations 106) may communicate with other nearby Wi-Fi devices (e.g., other client stations 106) within direct (e.g., one hop) radio range independent of any external infrastructure. For example, if a first device has a Wi-Fi radio and second device has a Wi-Fi radio, those radios should be useable to communicate directly, peer-to-peer, regardless of good behavior, bad behavior, or complete absence, of external infrastructure (e.g., a WLAN with range of the devices). This usage model is analogous to a group of friends using handheld walkie talkie radios at a remote ski resort to communicate peer-to-peer up on the mountain where no mobile phone service may be available.

Clock Coordination

In existing implementations, e.g., NAN, peer devices, in order to coordinate communications, synchronize clocks, e.g., to an elected master device within a cluster (or group) of devices. However, one issue with synchronization is that synchronizing is a transitive operation. For example, if device A is synchronized with device B and device B is synchronized with device C, then device A is synchronized to device C. In addition, if device A and all of its neighbors (peer devices) are synchronized, and device B and all of its neighbors are synchronized and device B happens to be a neighbor of device A, then that means that all of device A's neighbors and all of device B's neighbors have to be synchronized, even devices that may never communicate and never benefit from that synchronization. The recursive application of this property is the transitive closure and results in a whole community of connected devices trying to synchronize, perhaps millions of devices over distances of hundreds or even thousands of wireless hops.

Figure 4:
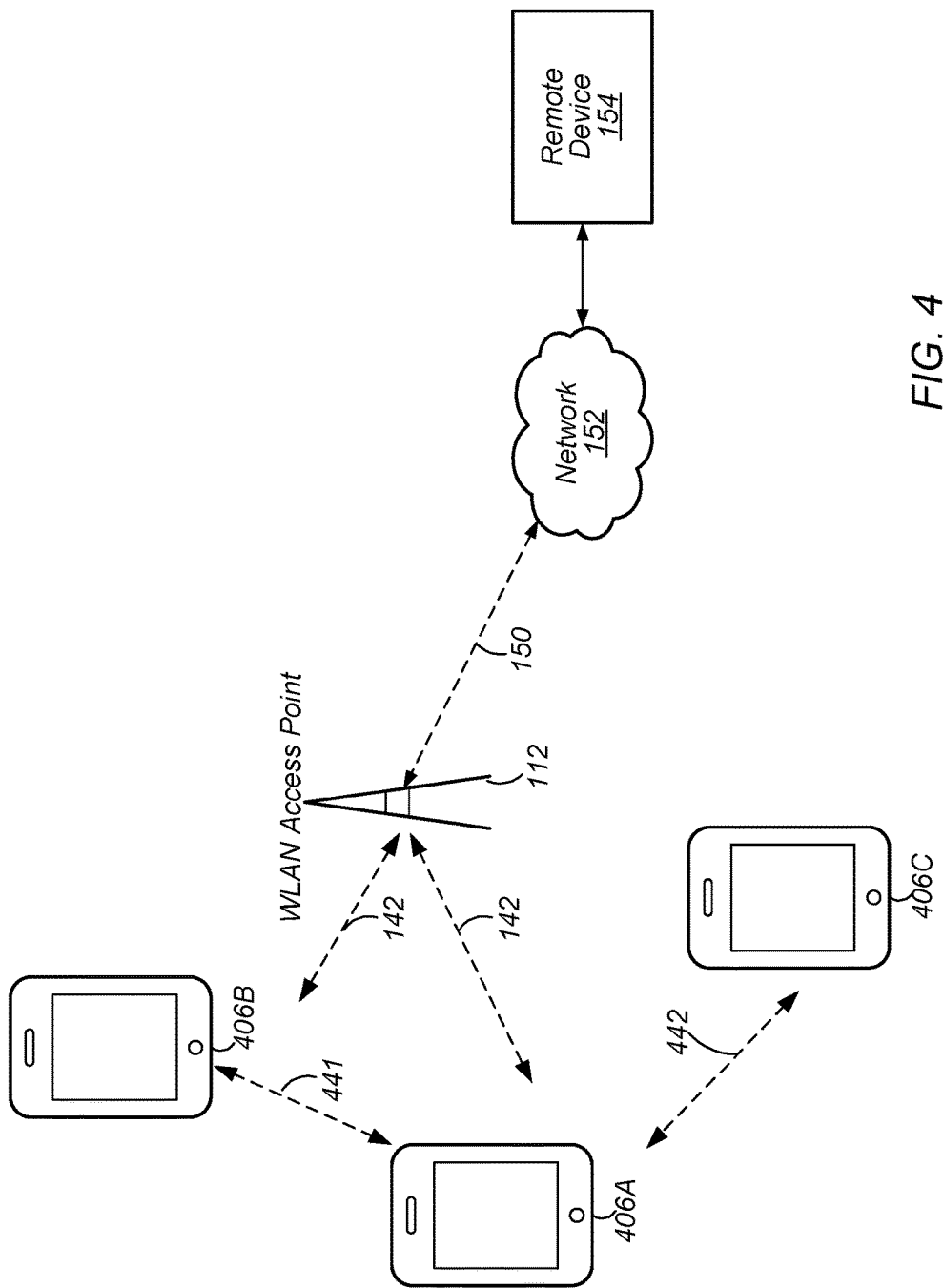
FIG. 4 illustrates an example of pairwise communications amongst peer devices, according to some embodiments.

Described herein are embodiments for a peer-to-peer communication scheme that relies on pairwise coordination. For example, as illustrated by FIG. 4, device 406A (which may be a client station such as client station 106) may observe (or may determine) that device 406B's clock is 5 time units (TUs) ahead of device 406A's clock. Device 406A may further observe that device 406C's clock is 7 TUs ahead of device 406A's clock. Thus, when device 406A proposes a transmission time to device 406B (e.g., via communications 441), device 406A may adjust its chosen transmission time for that message to match device 406B's clock. Similarly, when device 406A proposes a transmission time to device 406C (e.g., via communications 442), device 406A may adjust its chosen transmission time for that message to match device 406C's clock. In other words, devices may keep track of time offsets between their local clocks and the clocks of the peers around them, but no device ever has to change its own clock to match the clock of a peer, or expects a peer to do the same for the device.

Embodiments may support (or facilitate) (1) discovery of services (and discovery of devices providing those services) available within direct radio communication range (e.g., one hop), and (2) pairwise unicast communication between clients and servers within direct radio communication range. Thus, embodiments relate to a quick, easy, and reliable peer-to-peer connectivity. A typical use scenario may involve unicast transmission, however, embodiments may also support multicast transmissions, e.g., for discovery and rendezvous (e.g., Bonjour service discovery and/or IPv6 neighbor discovery) and/or bulk delivery to multiple simultaneous receivers (e.g., devices may transmit multicast packets multiple times on multiple channels, selected such that all intended recipients have an opportunity to receive each packet at least once).

In some embodiments, connectivity may be considered effectively "always on", where clients (e.g., client stations, such as client station 106) can discover and communicate with nearby servers (e.g., other client stations, such as client station 106), independent of traditional Wi-Fi access point association. In some embodiments, a client and server that are within radio range may be able to communicate (1) when either or both are not associated with any access point, (2) when client and server are associated with different, unrelated, access points, and/or (3) when client and server are associated with an access point that deliberately blocks peer-to-peer communication between associated stations. In other words, devices that are within range may be able to communicate without dependence on any external infrastructure, or even in the face of external infrastructure that is actively uncooperative with regard to facilitating peer-to-peer communication. Additional use cases may include, for example, short transfers (e.g., photo transfer between phones, walk-up printing, etc.) and long transfers (e.g., all-day binge watching Netflix™ or Hulu™, streamed from a portable device to a TV or to a HDMI device plugged into a TV).

Note that the embodiments described herein may allow for coexistence with other uses of the Wi-Fi radio, e.g., such as traditional Wi-Fi access point association and/or power-saving sleep states of the Wi-Fi radio. Thus, embodiments may operate at a 100% duty cycle (e.g., on a dedicated walk-up printer, connected to AC power, where a constant 500 mW to power the radio is acceptable) or at a lower duty cycle, where some of the radio time may be devoted to other uses or power-saving idle periods. In some embodiments, the lower the duty cycle, the more difficult it may be for clients to discover other devices and services offered. Thus, at extremely low duty cycles (including 0%) other technologies may be used for "wake up", such as Bluetooth/Bluetooth low energy, or even a simple manual button for activation (or "wake up") when needed.

In some embodiments, because Wi-Fi spectrum is a finite shared resource, devices may balance both energy usage by the device itself, which is a local matter for the device and usage of the radio spectrum, which is a public shared resource. Thus some embodiments may consume no radio spectrum at all when devices are not actively communicating.

Architectural Principles

Debuggability: When creating hardware, Design for Testability is an important industry principle. When creating protocols, Design for Debuggability is similarly important. During development stages, a design that is amenable to easy debugging is beneficial for making rapid progress and to fix the inevitable bugs that may occur early in an implementation. Moreover, particularly for networking technologies, designing for debuggability can remain crucial in production too, especially in a world where the environment cannot be fully controlled. For example, even if software on two communicating peer devices is fully debugged and flawless, those peer devices may find themselves in an environment where devices around them do not have such software. In such cases, it is advantageous to be able to debug a communication failure using only logs and packet traces from peer devices in question that are having trouble communicating. Ideally, communication between two peer devices may depend only on the correct operation of software on those two peer devices and not on correct operation of software on multiple unknown other devices. An architecture that minimizes dependency on unknown other devices helps improve reliability.

Minimize Interdependency: The combinatorial explosion of possibilities that results from a system that depends on correct operation of an unknown number of devices, from multiple vendors, with software of unknown quality, is intractable. Thus, for a reliable system, interdependency with other devices is minimized. The minimum number of devices involved in a pairwise communication is two, and consequently a design for a reliable system should strive to require only the correct operation of two devices: the two that are communicating.

Minimize Modes: When a problem is encountered, it can be tempting to address it by adding a new mode designed to handle that specific situation. However, every new mode that may be added increases complexity, making a system more difficult to understand and debug. One mode may be power-efficient but results in slow discovery; another mode may provide quicker discovery but consume more power. In other words, the more modes a system has, the greater the opportunities for the system to be in the wrong mode at any given time. In addition, not only does software for every different mode have to be developed and debugged, but also software responsible for choosing which mode to be in at any given moment also has to be developed and debugged. Thus, a more reliable system may adjust its behavior in a smooth continuous way, not in abrupt discontinuous jumps (e.g., via mode switching).

Bonjour Record Discovery: Devices may implement service discovery and device discovery using Bonjour service discovery records. Bonjour service discovery is typically performed using three main record types—pointer record (PTR), service record (SRV) and text record (TXT), however, embodiments may be defined in terms of primitive records instead of in terms of explicit service discovery to allow more flexibility and more general applicability. For example, according to embodiments, discovering a device's "A" (IPv4) and "AAAA" (IPv6) address records becomes just another use of a general record-discovery mechanism, rather than a separate special case that has to be handled separately. Other record types can be advertised and discovered as necessary, instead of requiring further special-case handling.

Limit Idle Traffic: It is important that the protocol is designed such that widespread deployment will not lead to it failing to work. Consuming spectrum to perform concrete work on behalf of a user is appropriate—the amount of spectrum used is related to the amount of useful work being done. Thus, embodiments include discovery as an active process (it consumes shared spectrum), but advertising as a passive process (it involves only listening). In other words, discovering records is an active task (e.g., active discovery) and involves transmission of query messages that consume radio spectrum. However, publishing records is a passive task (e.g., passive advertising), involving listening for query messages and responding. Hence, in the absence of query messages, publishing records consumes power but no radio spectrum. Note that in the absence of clients looking for a service, (passive) advertising can be thought of as a non-operation, and merely a potential service, waiting for clients to use it.

No Clear Network Boundaries: There are no announcement packets when a service comes online, and no goodbye packets when a service goes offline. Since the device offering the services, and the peers that may be seeking one of those services, are all mobile, there are no discrete "joining network" and "leaving network" events.

No Transitive Closure: The usual transitive closure property (if A can talk to B, and B can talk to C, then A can talk to C) of traditional multi-access links like Ethernet does not apply. A device "joins" a service by discovering it and sending packets to it. A device "leaves" a service by finishing using it, or by failing to get packets through to it in a reasonable time, and aborting the connection.

Proximity Wi-Fi Operation

In some embodiments, devices (e.g., client station 106) communicate by transmitting packets and by listening for packets sent by peer devices (e.g., other client stations 106). Any given packet may or may not be received by peer devices, e.g., depending on whether they are in range and/or on other factors like interference. Further, embodiments may use at least one and/or multiple (e.g., one or more) social channels, e.g., Wi-Fi 2.4 GHz channels 1, 6 and 11. In addition, devices advertising records may be required to be listening on at least one of the social channels from time to time. In some embodiments, a device may listen in blocks of at least 60 TUs (time units) of continuous listening on any social channel, with the intervals between listening start times randomly spaced from 250 TUs to 750 TUs, yielding an average of 60 TUs of listening on a social channel every 500 TUs. In some embodiments, longer blocks of continuous listening and/or shorter intervals between listening blocks may be implemented. In some embodiments, a device may listen in blocks of less than 60 TUs of continuous listening, spaced such that at least 250 TUs out of any 500 TUs period (50% of the time) is spent listening on a social channel. Note that a device associated with an AP that happens to be using Wi-Fi 2.4 GHz channel 1, 6 or 11 can meet the listening requirement simply by listening on its infrastructure channel for at least the required minimum amounts of time. Note further that the social channel may be required for an initial rendezvous between devices, and communications between devices may be conducted on a different, agreed upon channel. Thus, the amount of traffic on the social channel may be relatively light.

In some embodiments, when a device wishes to discover peers (e.g., to discover Bonjour records being advertised by potentially unknown nearby peers), the device may transmit discovery messages requesting Bonjour record(s) it seeks (e.g., services the device may seek). Note that discovery messages may be sent on one social channel, e.g., at 6 Mb/s, using 802.11g OFDM (Orthogonal Frequency-Division Multiplexing), or in a burst across multiple social channels. Note that the messages in a burst of messages may be sent as close as possible in time, subject to how quickly the radio can change channel. In some embodiments, these bursts of discovery messages may be sent every 50 TUs for as long as the device is seeking to discover records held by peers. For example, based on a transmission strategy of a burst every 50 TUs, within 750 TUs peers within range of the device should have received a discovery message at least once. Thus, after a few seconds of continuous discovery, the rate of sending discovery messages may decay to a lower rate, e.g., to avoid excessive load on the social channels.

In some embodiments, OFDM may be implemented instead of, or in addition to, CCK (Complementary Code Keying) modulation scheme used by 802.11b. In addition, note that according to some embodiments, not all 802.11g rates may be supported. For example, a device such as a home thermostat may support only the 802.11g OFDM 6 Mb/s rate, although it is contemplated that such devices may also support higher data rates associated with 802.11g.

In some embodiments, when a device advertises records as described above, the device may listen in blocks of less than 60 TUs of continuous listening, spaced such that at least 250 TUs out of any 500 TUs period (50% of the time) is spent listening on a social channel. In some embodiments, a device transmitting discovery messages may spend approximately 5 TUs to change channels and transmit the three messages, which accounts for approximately 15 TUs out of every 50 TUs (30%). Thus, for the remaining 70% of the 50 TUs, the device may spend up to 10% to maintain its infrastructure association, and the remainder of the 50 TUs listening on one of the social channels for incoming discovery messages. Note that, as described above, a device associated with an AP that happens to be using Wi-Fi 2.4

GHz channel 1, 6 or 11 can perform the task of maintaining its infrastructure association and the task of listening for incoming discovery messages on the same channel.

In some embodiments, discovery messages and certain other messages (e.g., as indicated below) may include a "receiver map" data structure which may indicate at what times, and on what channels, a sender of the message plans to be listening in the future. In some embodiments, the channels may include 2.4 GHz channels, 5 GHz channels, or other supported channels such as 900 MHz or 60 GHz. In some embodiments, the receiver map may indicate to peer devices at what time and on what channel the requester will be listening for responses. A requesting device that is not advertising any records of its own may still be required to listen on one of the 2.4 GHz channels for at least one 25 TU block of time every 100 TUs in order to be available to receive responses to its queries and may indicate its choice of channel and time in its outgoing receiver map to inform peers of its choice. Note that in some embodiments, the channel may be one of the 2.4 GHz channels, since some devices may only support 2.4 GHz operation.

In some embodiments, replies may not be required to be on the same channel as the discovery message that elicited them. For example, a device may have tuned only briefly to one of the (2.4 GHz) social channels to transmit a discovery message (including a receiver map, in some embodiments), but may be spending most of its time tuned to its infrastructure channel, which may be a better channel for it to receive replies. In some embodiments, the receiver map may allow for moving some communication, as appropriate, to other channels, to keep traffic on the social channels lower.

In some embodiments, at any given moment, a Wi-Fi device's transmit and receive circuitry must be tuned to the same channel for medium access purposes. In other words, before a device transmits on a channel, it must first listen on that channel to avoid interfering with an existing transmission on that channel. Thus, in some embodiments, during a time interval where a device's receiver map data structure has committed to being on a certain channel, the device may transmit and/or receive on that channel, and during a time interval that remains uncommitted in the receiver map data structure a device may be free to tune to any channel to transmit, but the device may not expect to receive any unicast data from peers during that time interval since peers have no way of knowing what channel the device will be on during that time interval.

In some embodiments, in order to perform a unicast transmission to a known peer, a sender (e.g., transmitting device) may wait until such a time as the known peer's receiver map indicates the known peer is committed to be on a certain channel, In some embodiments, in order to perform a unicast transmission, the sender may also need to (a) commit to be on the same channel at that time (e.g., as indicated in the sender's receiver map) and/or (b) be uncommitted at that time (e.g., as indicated in the sender's receiver map) such that the sender is free to tune to the receiver's channel.

Note that if a receiver map includes too little committed time, there may be limited opportunities to communicate, however, if a receiver map includes too much committed time and leaves too little time uncommitted time, senders may not be free to change channels to meet peer devices. For example, a peer may be listening and ready to receive, but the sender may have already committed to be on a different channel at that time. Thus, in some embodiments, a device may be keep approximately ⅔ of a particular time interval uncommitted. In other words, for a given time interval, a device may only commit ⅓ of the given time interval in a receiver map covering the given time interval.

As indicated above, communication may be considered pairwise. Thus, no clock synchronization between peers is implied or required to interpret a receiver map data structure. In some embodiments, the receiver map may include a transmitting devices' own (absolute) clock value at the moment of transmission and all other time values in the receiver map may be interpreted relative to the clock value at the moment of transmission. In some embodiments, a device may be responsible for making its own autonomous decisions about scheduling its radio usage, e.g., depending on its activity and/or other observed radio traffic. In some embodiments, various factors may contribute to this decision process. For example, a device offering services, that has AC power, and is otherwise idle, may listen for most or all of the time on social channels, so that it is easily discoverable. However, a device that wishes to save power, or is currently busy transferring data with an infrastructure access point, may listen on the social channel less of the time.

In some embodiments, a device that is offering no services and currently not issuing any discovery queries of its own may not listen on any 2.4 GHz channels. Additionally, a device that is actively transferring a large amount of data with a peer device may choose to listen on a different channel for some portion of the time (e.g., as indicated in its receiver map) in order to move bulk traffic off social channel. Note that peers may indicate which radio bands and rates they support so a device can take this information into account when deciding which other channel(s) it may listen on.

In some embodiments, a querying device (e.g., a device issuing discovery queries) may have an indication of which particular device it expects to respond and, if the querying device has a receiver map for that particular device, the querying device may use the receiver map to guide its selection of when and on what channel to send its queries. However, in the absence of an expected reply, the querying device may send query messages on the social channels, as described above.

In some embodiments, query messages may include known answer lists to suppress unnecessary responses for services that the querying device already knows about. Note that records in known answer lists may be used only for this purpose, in some embodiments. Other devices hearing these query messages may not add any known answer records to their own caches. In addition, know answer records may not be authoritative. In other words, know answer records may be an indication of how a device views (e.g., understands) a current network reality (e.g., a current network topology) from the device's vantage point in the network which may not be correct for other devices. In other words, if one device is in range of a given peer and can hear from it does not necessarily imply that another device is in range of that same peer and will be able to hear from it.

In some embodiments, devices querying for records as a result of direct user action may transmit query messages more rapidly than sending queries in the background not directly caused by explicit user action. In some embodiments, the query rate may decay over time for a long-lasting query. In addition, other information, such as device movement may be taken into account in deciding when to raise or lower a query message transmission rate.

In some embodiments, a receiver map may include data indicating device capabilities such as which (Wi-Fi) bands and channels the device may communicate on as well as at what rates the device is capable of communicating. In some embodiments, such data may aid peer devices in selecting a receiver map. For example, a device that is in active communication with a peer device may decide to listen on some other band or channel for some portion of time (and announce this in its receiver map) and the device's decision about which bands and channels to listen on may be based, at least in part, on knowledge of which bands and channels the transmitting device supports.

In some embodiments, discovery queries may not be acknowledged by receivers, except inasmuch as discovery messages may elicit discovery responses from one or more peers. For example, when a device receives a query for a record it is publishing, the device may transmit a unicast response to the querying device at a time and on a channel indicated in the receiver map sent by the querying device. In some embodiments, Bonjour "additional record" mechanism may be used to include additional records that may be of interest, e.g., a response containing a PTR record may include an associated SRV, TXT, A, and AAAA records describing the service. In some embodiments, the response message may also include the responder's receiver map.

In some embodiments, a device may adjust a receiver map according to current and anticipated future activity. In some embodiments, adjustments may occur incrementally such that devices attempting to communicating do not immediately adopt one another's receiver maps leading to missed communications (e.g., if device A and B have disjointed receiver maps, immediate adoption may result in continued disjointed receiver maps). Thus, randomness may be introduced into receiver map adjustment and announcement times to de-synchronize receiver map announcements such that a device has time to see an announcement from its peer before making its own decisions about what local adjustments to make to its receiver map.

In some embodiments, a device may maintain a cache (or data structure) of receiver maps received from peer devices. Maintaining the cache may include pruning receiver maps received from peer devices outside of a time period. In other words, once a receiver map has aged past a certain time, it may be removed from the cache as not being current. The cache may aid a device when the device transmits a message likely to be answered by a particular peer, e.g., the device may use the peer's receiver map to determine a time and channel to send the message for most likely reception by the peer device. For example, when a device issues a query for an SRV or TXT record, it may reference a receiver map of a peer device that transmitted an associated PTR record giving the name of the SRV or TXT record such that the device may transmit the query at a time when the peer device is known to be listening.

In some embodiments, a device with limited storage may choose to limit a number of receiver map cache entries to store. Thus, when the receiver map cache is full, the device may discard cache entries according to its own local policy. In some embodiments, deciding which cache entries to discard may include consideration of various factors, such as signal strength with which a receiver map cache entry was received, a time elapsed since the receiver map cache entry was received, how recently the device communicated with a peer associated with the receiver map, and whether the device anticipates communicating again with the peer in the near future.

Clock Accuracy

In some implementations, synchronization may be thought as an all-or-nothing concept. A device cannot synchronize its clock with two different other clocks. The device can only synchronize its clock with two different peers if the peers' clocks are also synchronized, leading to the scenario described previously, e.g., an unbounded number of clocks would need to be synchronized. This unbounded spread of a rigid constraint though the entire mesh of communicating devices is an impossible requirement. A workable alternative may be that a device can allow its behavior to be partially influenced by its peers, instead of totally dictated by them, e.g., dilution of influence.

For example, if a device broadcasts information (like its clock and its channel availability) to its immediate (e.g., within one hop) neighbors (peers), then this potentially imposes constraints on those immediate neighbors. If the immediate neighbors choose to adopt the device's clock and channel availability map in its entirety and broadcast that to their neighbors, then the immediate neighbors may propagate that constraint outwards, potentially without limit. This results in the whole mesh having to move in rigid lock-step.

Alternatively, suppose a device (B) chooses to adopt only half of the channel availability from active communication peer (A) and for the other half of its channel availability map, device (B) makes its own independent decisions, e.g., based on its own requirements, such as maintaining its infrastructure connection. In addition, a peer (C) that is paying attention to the channel availability of device (B) may only that to constrain half of peer (C)'s radio usage and peer (C) decides the other half independently. Thus, peer (C) is paying attention to device (B) and is only ¼ influenced by peer (A). Similarly, a peer (D) that is paying attention to the channel availability of peer (C) is only ⅛ influenced by peer (A). This exponential decay of influence means that after a few hops through a mesh the effect of any particular device on another device has been diluted to a point of negligibility. The behavior of any given device is constrained only by its immediate peers, and indirectly, to a weaker extent, by peers of the immediate peers, and even more indirectly, to an even weaker extent, by peers of the peers of the immediate peers. Thus, by limiting the influence of a device on its distant neighbors, focus may be made on pairwise communication between devices.

In some embodiments, devices may include a clock with a precision of one microsecond or better and accuracy better than 500 parts per million at all temperatures in all operating conditions. In such embodiments, a worst case aggregate drift between a sender's and a receiver's clocks could be up to 1000 parts per million, or 0.1%. Further, in some embodiments, time values included in packets may generally be represented using 32-bit values in microseconds (a modular (cyclic) time value that repeats approximately every 70 minutes). This may allow times, when interpreted relative to a current time value, to be represented in the range $\pm 2^{31}$ µs and from approximately 35 minutes in the past to approximately 35 minutes in the future. In some embodiments, to avoid ambiguity in interpreting values at extreme edges of the range, time values may be limited to being expressed in the range $\pm 2^{30}$ µs relative to the current time, from approximately 17 minutes in the past to approximately 17 minutes in the future.

In addition, in some embodiments, devices transmitting a packet may insert a timestamp value (e.g., a 32-bit, a 64-bit, and/or a 128-bit timestamp value) into an outgoing packet. The timestamp value may be based on its own local clock at the moment actual transmission over the air begins. In some embodiments, an error of no greater than ±512 µs may be tolerated (e.g., incorporated). Further, devices receiving a packet may tag the packet with a timestamp value (e.g., a 32-bit, a 64-bit, and/or a 128-bit timestamp value) recording the timestamp value of its own local clock at the moment reception of the packet began. In some embodiments, an error of no greater than ±512 µs may be tolerated.

Note that the error tolerances indicate that at the moment a packet is received, there could be an initial error of up to ±1 TUs in the interpretation of time values and as the data in memory ages, this error could increase at a rate of ±1 TUs per second. Such an error bound may be taken into account when interpreting timestamp values received from peers sometime in the past. For example, receiver map availability windows may be interpreted as having guard bands at a beginning and end to allow for possible clock differences. Thus, a receiver map entry received 5 seconds ago from a peer advertising availability on a given channel for 16 TUs may be interpreted to allow for a possible 6 TUs clock difference. Note that a 6 TUs guard band at the start and end of the 16 TUs available time leaves a 4 TUs usable window and by 7 seconds after reception, a 16 TUs availability window is no longer useful and may be discarded. Note that a device may retain availability window data longer than this rule suggests, e.g., on grounds that approximate information is better than no information at all.

In some embodiments, peers that are in active communication may exchange receiver maps frequently enough for them to remain useful. In other words, when sufficient time has elapsed that the start and end guard bands each consume a specified portion (e.g., approximately 12.5%, 20%, 25%, and so forth) of an availability window (e.g., leaving 75%, 60%, 50%, and so forth of usable time) updated receiver maps may be exchanged. For example, if the specified portion is 12.5% of the availability window, even if a single receiver map update is lost, a next receiver map update may arrive by the time the usable time has decreased to 50% of the availability window. In some embodiments, devices may send receiver map updates more frequently, e.g., if a receiver advertises a receiver map with listening slots 48 TUs long and after 5 seconds the listening slots will have accumulated 6 TUs guard bands at the start and end, then the receiver may transmit an updated receiver map.

Receiver Map Format

In some embodiments, multi-byte numeric quantities may be transmitted least-significant byte first (little endian). A receiver map may begin with an indication of which bands and channels the associated device supports. In some embodiments, a list of preferred channels may also be included. Following the indication, the receiver map may include:

An expiration time parameter: The expiration time may be in a time base of the associated device's (e.g., the sender's) local clock. The expiration time may be four-bytes and interpreted as microseconds. In some embodiments, in conjunction with the sender's timestamp placed in the packet upon transmission and a receiver's time tag attached to the packet upon reception, the receiver may be able to adjust this value to be a time relative to its own local clock. Thus, when this expiration time is reached (or obtains), the entire receiver map may be considered invalid and may be discarded.

A repeat cycle parameter: The repeat cycle parameter may be a two-byte quantity indicating a repeat cycle of the receiver map in a specified time unit such as IEEE 802.11 time units (1.024 milliseconds). In some embodiments, the receiver map may be considered to repeat over and over with period given by the repeat cycle parameter.

A number of entries: The number of entries may be a two-byte count giving a number of entries in the receiver map.

Following the number of entries, the receiver map may include an array of receiver map entries. In some embodiments, a receiver map entry may include eight bytes. In some embodiments, a receiver map entry may contain at least four fields:

A band identifier: The band identifier may be a one-byte quantity, with each value associated with a different band. For example, a value of 0 may be associated with the 900 MHz band, a value of 1 may be associated with the 2.4 GHz band, a value of 2 may be associated with the 3.65 GHz band, a value of 3 may be associated with the 4.9 GHz band, a value of 4 may be associated with the 5.0 GHz band, a value of 5 may be associated with the 5.9 GHz band, and a value of 6 may be associated with the 60 GHz band. Other associations are contemplated.

Channel number: The channel number may be a one-byte quantity giving the channel within the indicated band. Note that there may be overlap in channel number assignments, e.g., 2.4 GHz and 5 GHz both have a "channel 11".

Slot duration: The slot duration may be a two-byte quantity and may be indicated in IEEE 802.11 TUs. In some embodiments, durations may range from 1 TU to approximately 65 seconds.

Slot start time: The slot start time may be a four-byte quantity and may be indicating in microseconds and in the time base of the sender's local clock.

In some embodiments, receiver map entries may be arranged within the receiver map in order of increasing slot start time. In some embodiments, if a device receives a receiver map where the slot start times are not in order of increasing slot start time, the receiver map may be ignored.

In some embodiments, a transmitting device (e.g., sender) may not include receiver map entries which may no longer be useful when their time arrives, e.g., according to the clock accuracy calculations discussed above. For example, a receiver map may not include entries for 15 TUs slots more than 7 seconds in the future, and/or for 45 TUs slots more than 22 seconds in the future.

Note that in some embodiments, since a device cannot immediately tune a radio to a different channel, consecutive receiver map entries may not be contiguous in time. In other words, there may be (at least) brief time gaps between consecutive time slots to allow time for tuning to a new channel. Further, since different radios require different amounts of time to tune to a different channel, it is not possible to safely make assumptions about another device's channel tuning times, thus, an advertised receiver map may make explicit allowance for a particular radio's channel tuning time and advertise listening time slots based on the particular radio's ability to tune to another channel. In some embodiments, a device may have multiple Wi-Fi radio receivers which can operate concurrently. In such embodiments, it may be acceptable for the receiver map to have no time gap between consecutive time slots, and/or overlapping time slots.

Note that receiver map entries may be firm commitments to be listening on a certain channel at a certain time in the future. Thus, devices may not, except in extreme circumstances, miss commitments. In other words, if a peer decides to transmit to a device at a time the device indicated and the device does not respond, the peer may conclude that the device is no longer available which has a potential to result in a poor user experience if the device is available.

Note further that since channel commitments, once made, are firm, devices may not overcommit and may not announce channel commitments too far in advance. Typically, a device that is in a mostly idle state may announce channel commitments no further than 10 seconds into the future and may make channel commitments for at most ⅓ of that time. The remaining ⅔ may be left uncommitted, e.g., to give the device freedom to adjust its behavior according to changing requirements.

Discovery Message Format and Device Addressing

In some embodiments, messages may be encoded in the same format as Multicast DNS query and response messages, but with no IP or UDP header. In addition, in some embodiments, messages may be transmitted as 802.11 Action Frames.

In some embodiments, devices may use IPv6 address. Thus, a device may configure a self-assigned IPv6 link-local address on a peer-to-peer (e.g., Proximity Wi-Fi) interface. The self-assigned IPv6 link-local address may be algorithmically derived from the device's Wi-Fi MAC address using a SLAAC algorithm. This may allow the device to determine the Wi-Fi MAC address corresponding with an IPv6 link-local destination address algorithmically, e.g., without requiring IPv6 Neighbor Discovery packets. Note that as long as the Wi-Fi MAC addresses are unique, the corresponding IPv6 link-local addresses will also be unique. In some embodiments, a device may change the MAC address from time to time (e.g., for privacy reasons), which may result in the IPv6 link-local addresses also changing. Note that when a device changes its address in this fashion, it may appear to peers that an old device has departed and a new device has arrived. In effect, the device has shed its old identity and taken on a new identity without overtly revealing to peers that it is in fact still the same device.

In some embodiments, to enable communication with devices more than a single hop away devices may also configure other IPv6 addresses (non link-local) to be used in conjunction with a mesh routing protocol. Note that if IPv6 Neighbor Discovery needs to be used to map IPv6 destination addresses to Proximity Wi-Fi MAC addresses, the discovery may be performed using discovery packets as described herein instead of traditional multicast or broadcast packets.

Pairwise Unicast Communication

In some embodiments, when a device wishes to engage in unicast communication with a peer (typically TCP or UDP), the device may transmit a unicast packet addressed to the peer's IPv6 link-local address. The packet may be transmitted at a time and on a channel where the peer's receiver map indicates it is likely to be listening. Unicast packets may be acknowledged at the link layer and the rate the unicast packets are sent may be determined using a Wi-Fi Minstrel rate adaptation algorithm and/or other similar algorithms. A portion of transmitted unicast packets may include the device's (e.g., sender's) receiver map, e.g., at a rate appropriate to keep the peer's copy of the receiver map sufficiently up to date. In some embodiments, the device's and receiver's clocks may not run at the same rate, thus periodically updating the receiver map may be necessary to prevent information in the receiver map from becoming too old to be useful and may also allow the device to adjust its receiver map as necessary to accommodate changes in its activity. Note that in some embodiments, unicast packets may be acknowledged as specified in IEEE 802.11.

In some embodiments, if the device loses contact with the peer with which it is communicating (and/or has no receiver map for the unicast destination address in a packet), then to establish (or reestablish) contact with the peer, the device may transmit the packet repeatedly using multicast on social channels, e.g., in the same manner as discovery packets as described above.

Discovery/Departure

In some existing implementations (e.g., Bonjour), record lifetimes of an hour or more may be implemented since departure from a network is a clearly defined event which causes the cache to be flushed. However, in embodiments described herein, departure may involve moving a few feet out of range. Thus, lifetime for records, in some embodiments, may be limited to no more than a specified time period such as 30 seconds, 60 seconds, 120 seconds, and so forth.

In some existing implementations (e.g., Multicast DNS), Passive Observation Of Failures (POOF) may be implemented. For example, on a traditional network, a multicast service model may provide high probability that a multicast message received by one device on a link should be received by all devices on the link. Therefore, on a traditional network link with usual transitive closure properties, failure to observe expected responses to a given query issued by another device on the link is a reasonable indication that the expected responder is no longer present. However, embodiments described herein may not provide any concept of a link, e.g., where all devices on the link are equally reachable from all other devices on the link. Instead, each device has its own unique collection of peers it can hear from and the fact that some other nearby device is unable to communicate with one of the peers is not a firm indication that the device will not be able to communicate with that peer. Thus, in some embodiments, POOF may not be implemented.

Name Conflicts

In some embodiments, when a device receives records conflicting with names of its own records, the device may need select new names for those records. In some embodiments, new names may be selected (or derived) based on a name adjustment algorithm. In some embodiments, a permanent stable name may be implemented to avoid naming conflicts.

Mobility

In some embodiments, location information (e.g., from GPS or other sources) may be used as a factor to influence frequency of transmissions and retransmissions. For example, a device that has changed location may issue more frequent queries to discover new devices that have come into range and to ascertain which previously seen devices are no longer in range as compared to a device that has not changed location.

Figure 5:
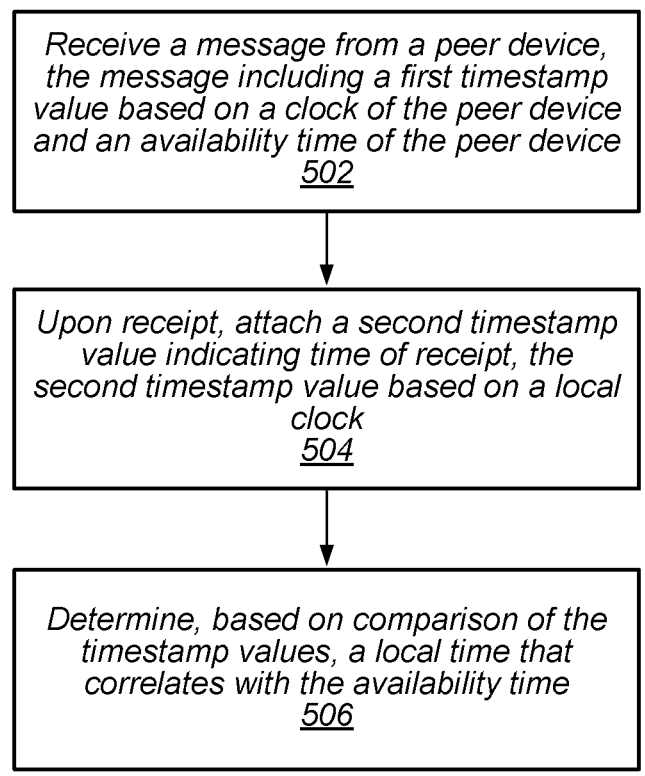
FIG. 5 illustrates a block diagram of an example of a method for pairwise coordination of peer devices, according to some embodiments.
Figure 6:
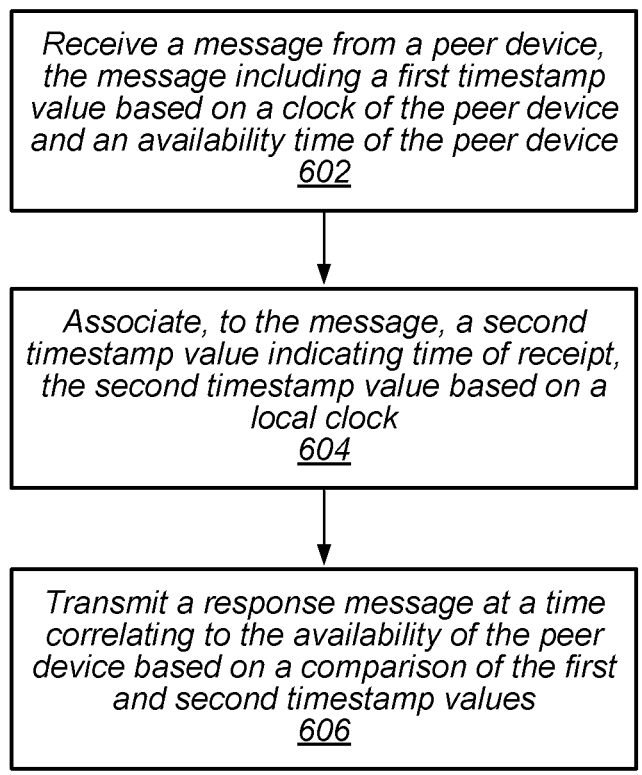
FIG. 6 illustrates a block diagram of another example of a method for pairwise coordination of peer devices, according to some embodiments.
Figure 7:
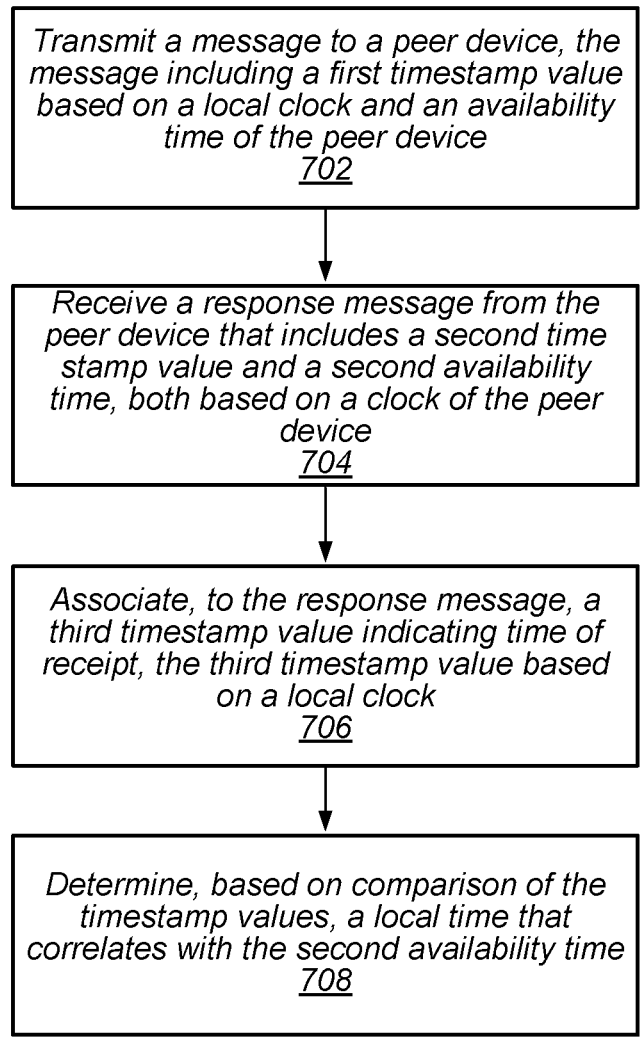
FIG. 7 illustrates a block diagram of a further example of a method for pairwise coordination of peer devices, according to some embodiments.

FIGS. 5-7: Block Diagrams of Methods for Pairwise Coordination of Peer Devices

FIG. 5 illustrates a block diagram of an example of a method for pairwise coordination of peer devices, according to some embodiments. The method shown in FIG. 5 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502, a wireless station, such as wireless station 106, may receive a message from a neighboring peer station (e.g., another wireless station 106) via Wi-Fi peer-to-peer communication. In other words, the wireless station may receive a message from a neighboring peer station in a peer-to-peer manner, e.g., without the communications going through an intervening access point. The message may include a first timestamp value indicating time of transmission (by the neighboring peer station) of the message and an availability time (of the neighboring peer station) for peer-to-peer communications. The first timestamp value and availability time may both be based on a clock local to the neighboring peer station. In other words, the neighboring peer station may use a local clock to determine time of transmission and availability time(s). In some embodiments, the message may include a data structure (or data table, e.g., a receiver map as described above) indicating future times (e.g., time periods subsequent to transmission time of the message) and channels the neighboring peer station may be listening. The future times may be based on the clock local of the neighboring peer station. In some embodiments, the channels may include one or more of a 2.4 gigahertz channel, a 5 gigahertz channel, a 900 megahertz channel, and/or a 60 gigahertz channel. In some embodiments, the data structure (or an additional data structure) may be included in the message that indicates capabilities of the neighboring peer station. The capabilities may include, for example, one or more of Wi-Fi bands the neighboring peer station can communicate on, channels the neighboring peer station can communicate on, and/or rates at which the neighboring peer station is capable of communicating.

At 504, the wireless station may attach to (or insert in) the message a second timestamp value indicating time of receipt (at the wireless station) of the message. The second timestamp value may be based on a local clock of the wireless station.

At 506, the wireless station may determine, e.g., based on a comparison of the first and second timestamp values, a time local to the wireless station that correlates to (or corresponds to) the availability time of the neighboring peer station included in the message.

In some embodiments, the wireless station may transmit a response message to the neighboring peer station via peer-to-peer communication. The response message may include a third timestamp value indicating time of transmission (by the wireless station) of the response message and an availability time of the wireless station for peer-to-peer communications with the neighboring peer station. The third timestamp and the second availability time may be based on the local clock of the wireless station. In some embodiments, the response message may include a data structure (or data table, e.g., a receiver map as described above) indicating future times (e.g., time periods subsequent to transmission time of the message) and channels the wireless station may be listening. The future times may be based on the clock local of the wireless station. In some embodiments, the channels may include one or more of a 2.4 gigahertz channel, a 5 gigahertz channel, a 900 megahertz channel, and/or a 60 gigahertz channel. In some embodiments, the data structure (or an additional data structure) may indicate capabilities of the wireless station. The capabilities may include, for example, one or more of Wi-Fi bands the wireless station can communicate on, channels the wireless station can communicate on, and/or rates at which the wireless station is capable of communicating. In some embodiments, the response message may be transmitted on a different channel than the message was received.

In some embodiments, the response message may additionally (or alternatively) include information regarding a record the wireless station has published. For example, the neighboring peer wireless station may implement service discovery and device discovery using Bonjour service discovery records. In some embodiments, the record may be a primitive record to allow more flexibility and more general applicability. For example, according to embodiments, discovering a wireless station's "A" (IPv4) and "AAAA" (IPv6) address records becomes just another use of a general record-discovery mechanism, rather than a separate special case that has to be handled separately. Other record types can be advertised and discovered as necessary, instead of requiring further special-case handling.

In some embodiments, the wireless station and the neighboring peer wireless station may exchange further messages to support (or facilitate) discovery of services. In some embodiments, the wireless station may receive a unicast transmission from the neighboring peer wireless station. In some embodiments, the wireless station may receive a multicast transmission, e.g., for discovery and rendezvous (e.g., Bonjour service discovery and/or IPv6 neighbor discovery) and/or bulk delivery to multiple simultaneous receivers (e.g., devices may transmit multicast packets multiple times on multiple channels, selected such that all intended recipients have an opportunity to receive each packet at least once) from the neighboring peer station.

In some embodiments, the wireless station and neighboring peer wireless station may communicate (1) when either or both are not associated with any access point, (2) when they are associated with different, unrelated, access points, and/or (3) when they are associated with an access point that may deliberately block peer-to-peer communication between associated stations. In other words, communications between the wireless station and the neighboring peer wireless station may occur without dependence on any external infrastructure, or even in the face of external infrastructure that is actively uncooperative with regard to facilitating peer-to-peer communication.

FIG. 6 illustrates a block diagram of another example of a method for pairwise coordination of peer devices, according to some embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, a wireless station, such as wireless station 106, may receive a message from a neighboring peer station (e.g., another wireless station 106) via Wi-Fi peer-to-peer communication. In other words, the wireless station may receive a message from a neighboring peer station in a peer-to-peer manner, e.g., without the communications going through an intervening access point. The message may include a first timestamp value indicating time of transmission (by the neighboring peer station) of the message and an availability time (of the neighboring peer station) for peer-to-peer communications. The first timestamp value and availability time may both be based on a clock local to the neighboring peer station. In other words, the neighboring peer station may use a local clock to determine time of transmission and availability time(s). In some embodiments, the message may include a data structure (or data table, e.g., a receiver map as described above) indicating future times (e.g., time periods subsequent to transmission time of the message) and channels the neighboring peer station may be listening. The future times may be based on the clock local of the neighboring peer station. In some embodiments, the channels may include one or more of a 2.4 gigahertz channel, a 5 gigahertz channel, a 900 megahertz channel, and/or a 60 gigahertz channel. In some embodiments, the data structure (or an additional data structure) may be included in the message that indicates capabilities of the neighboring peer station. The capabilities may include, for example, one or more of Wi-Fi bands the neighboring peer station can communicate on, channels the neighboring peer station can communicate on, and/or rates at which the neighboring peer station is capable of communicating.

At 604, the wireless station may associate, to the message, a second timestamp value indicating time of receipt (at the wireless station) of the message. The second timestamp value may be based on a local clock of the wireless station.

At 606, the wireless station may transmit a response message at a time correlating to the availability time of the neighboring peer station. The time may be based on a comparison of the first and second timestamp values. The time may be based on the local clock of the wireless station.

In some embodiments, the wireless station may transmit a response message to the neighboring peer station via peer-to-peer communication. The response message may include a third timestamp value indicating time of transmission (by the wireless station) of the response message and an availability time of the wireless station for peer-to-peer communications with the neighboring peer station. The third timestamp and the second availability time may be based on the local clock of the wireless station. In some embodiments, the response message may include a data structure (or data table, e.g., a receiver map as described above) indicating future times (e.g., time periods subsequent to transmission time of the message) and channels the wireless station may be listening. The future times may be based on the clock local of the wireless station. In some embodiments, the channels may include one or more of a 2.4 gigahertz channel, a 5 gigahertz channel, a 900 megahertz channel, and/or a 60 gigahertz channel. In some embodiments, the data structure (or an additional data structure) may indicate capabilities of the wireless station. The capabilities may include, for example, one or more of Wi-Fi bands the wireless station can communicate on, channels the wireless station can communicate on, and/or rates at which the wireless station is capable of communicating. In some embodiments, the response message may be transmitted on a different channel than the message was received.

In some embodiments, the response message may additionally (or alternatively) include information regarding a record the wireless station has published. For example, the neighboring peer wireless station may implement service discovery and device discovery using Bonjour service discovery records. In some embodiments, the record may be a primitive record to allow more flexibility and more general applicability. For example, according to embodiments, discovering a wireless station's "A" (IPv4) and "AAAA" (IPv6) address records becomes just another use of a general record-discovery mechanism, rather than a separate special case that has to be handled separately. Other record types can be advertised and discovered as necessary, instead of requiring further special-case handling.

In some embodiments, the wireless station and the neighboring peer wireless station may exchange further messages to support (or facilitate) discovery of services. In some embodiments, the wireless station may receive a unicast transmission from the neighboring peer wireless station. In some embodiments, the wireless station may receive a multicast transmission, e.g., for discovery and rendezvous (e.g., Bonjour service discovery and/or IPv6 neighbor discovery) and/or bulk delivery to multiple simultaneous receivers (e.g., devices may transmit multicast packets multiple times on multiple channels, selected such that all intended recipients have an opportunity to receive each packet at least once) from the neighboring peer station.

In some embodiments, the wireless station and neighboring peer wireless station may communicate (1) when either or both are not associated with any access point, (2) when they are associated with different, unrelated, access points, and/or (3) when they are associated with an access point that may deliberately block peer-to-peer communication between associated stations. In other words, communications between the wireless station and the neighboring peer wireless station may occur without dependence on any external infrastructure, or even in the face of external infrastructure that is actively uncooperative with regard to facilitating peer-to-peer communication.

FIG. 7 illustrates a block diagram of a further example of a method for pairwise coordination of peer devices, according to some embodiments. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a wireless station, such as wireless station 106, may transmit a message to a neighboring peer station (e.g., another wireless station 106) via Wi-Fi peer-to-peer communication. In other words, the wireless station may transmit (or a processor of the wireless station may generate instructions for the wireless station to transmit) a message to a neighboring peer station in a peer-to-peer manner, e.g., without the communications going through an intervening access point. The message may include a first timestamp value indicating time of transmission (by the wireless station) of the message and an availability time (of the wireless station) for peer-to-peer communications. The first timestamp value and availability time may both be based on a local clock of the wireless station. In other words, the wireless station may use a local clock to determine time of transmission and availability time(s). In some embodiments, the message may include a data structure (or data table, e.g., a receiver map as described above) indicating future times (e.g., time periods subsequent to transmission time of the message) and channels the wireless station may be listening (e.g., waiting to receive a transmission from a neighboring peer wireless station(s)). The future times may be based on the local clock of the wireless station. In some embodiments, the channels may include one or more of a 2.4 gigahertz channel, a 5 gigahertz channel, a 900 megahertz channel, and/or a 60 gigahertz channel. In some embodiments, the data structure (or an additional data structure) may be included in the message that indicates capabilities of the wireless station. The capabilities may include, for example, one or more of Wi-Fi bands the wireless station can communicate on, channels the wireless station can communicate on, and/or rates at which the wireless station is capable of communicating.

At 704, the wireless station may receive a response message from the neighboring peer station via Wi-Fi peer-to-peer communication. In other words, the wireless station may receive a response message from a neighboring peer station in a peer-to-peer manner, e.g., without the communications going through an intervening access point. The message may include a second timestamp value indicating time of transmission (by the neighboring peer station) of the response message and an availability time (of the neighboring peer station) for peer-to-peer communications. The second timestamp value and availability time may both be based on a clock local to the neighboring peer station. In other words, the neighboring peer station may use a local clock to determine time of transmission and availability time(s). In some embodiments, the response message may include a data structure (or data table, e.g., a receiver map as described above) indicating future times (e.g., time periods subsequent to transmission time of the message) and channels the neighboring peer station may be listening. The future times may be based on the clock local of the neighboring peer station. In some embodiments, the channels may include one or more of a 2.4 gigahertz channel, a 5 gigahertz channel, a 900 megahertz channel, and/or a 60 gigahertz channel. In some embodiments, the data structure (or an additional data structure) may be included in the response message that indicates capabilities of the neighboring peer station. The capabilities may include, for example, one or more of Wi-Fi bands the neighboring peer station can communicate on, channels the neighboring peer station can communicate on, and/or rates at which the neighboring peer station is capable of communicating.

At 706, the wireless station may associate, to the response message a third timestamp value indicating time of receipt (at the wireless station) of the message. The third timestamp value may be based on the local clock of the wireless station.

At 708, the wireless station may determine, e.g., based on a comparison of the second and third timestamp values, a time local to the wireless station that correlates to (or corresponds to) the availability time of the neighboring peer station included in the response message.

In some embodiments, the wireless station may transmit a further response message to the neighboring peer station via peer-to-peer communication. The further response message may include a fourth timestamp value indicating time of transmission (by the wireless station) of the response message and an availability time of the wireless station for peer-to-peer communications with the neighboring peer station. The fourth timestamp and the availability time may be based on the local clock of the wireless station. In some embodiments, the further response message may include a data structure (or data table, e.g., a receiver map as described above) indicating future times (e.g., time periods subsequent to transmission time of the message) and channels the wireless station may be listening. The future times may be based on the clock local of the wireless station. In some embodiments, the channels may include one or more of a 2.4 gigahertz channel, a 5 gigahertz channel, a 900 megahertz channel, and/or a 60 gigahertz channel.

In some embodiments, the message (and/or the further response message) may additionally (or alternatively) include information regarding a record the wireless station has published. For example, the neighboring peer wireless station may implement service discovery and device discovery using Bonjour service discovery records. In some embodiments, the record may be a primitive record to allow more flexibility and more general applicability. For example, according to embodiments, discovering a wireless station's "A" (IPv4) and "AAAA" (IPv6) address records becomes just another use of a general record-discovery mechanism, rather than a separate special case that has to be handled separately. Other record types can be advertised and discovered as necessary, instead of requiring further special-case handling.

In some embodiments, the wireless station and the neighboring peer wireless station may exchange further messages to support (or facilitate) discovery of services. In some embodiments, the wireless station may receive a unicast transmission from the neighboring peer wireless station. In some embodiments, the wireless station may receive a multicast transmission, e.g., for discovery and rendezvous (e.g., Bonjour service discovery and/or IPv6 neighbor discovery) and/or bulk delivery to multiple simultaneous receivers (e.g., devices may transmit multicast packets multiple times on multiple channels, selected such that all intended recipients have an opportunity to receive each packet at least once) from the neighboring peer station.

In some embodiments, the wireless station and neighboring peer wireless station may communicate (1) when either or both are not associated with any access point, (2) when they are associated with different, unrelated, access points, and/or (3) when they are associated with an access point that may deliberately block peer-to-peer communication between associated stations. In other words, communications between the wireless station and the neighboring peer wireless station may occur without dependence on any external infrastructure, or even in the face of external infrastructure that is actively uncooperative with regard to facilitating peer-to-peer communication.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   a wireless interface configured to perform wireless communications;
   a clock; and
   at least one processor communicatively coupled to one or more radios and the local clock, wherein the one or more radios are associated with the wireless interface;
   wherein the at least one processor is configured to cause the wireless station:
   receive a first message from a peer station via Wi-Fi peer-to-peer communication, wherein the first message includes a first timestamp value indicating time of transmission of the first message and a first availability time for communications, wherein the first timestamp value and the first availability time are based on a local clock of the peer station;

attach to the first message a second timestamp value indicating time of receipt of the first message, wherein the second timestamp value is based on the clock of the wireless station;

determine, based on comparison of the first and second timestamp values, a local time that correlates to the availability time of the neighboring peer station; and transmit a second message to the peer station via Wi-Fi peer-to-peer communication, wherein the second message includes a third timestamp value indicating time of transmission of the second message and a second availability time for communications, wherein the third timestamp and the second availability time are based on the clock of the wireless station.

2. The wireless station of claim 1, wherein the first message includes a data structure indicating future times and channels the peer station will be listening, wherein the future times are based on the local clock of the peer station.

3. The wireless station of claim 1, wherein the second message includes a data structure indicating future times and channels the wireless station will be listening, wherein the future times are based on the clock of the wireless station.

4. The wireless station of claim 3, wherein the channels comprise one or more of a 2 g gigahertz channel, a 5 gigahertz channel, a 900 megahertz channel, or a 60 gigahertz channel.

5. The wireless station of claim 1, wherein the first message includes a data structure that indicates capabilities of the neighboring peer station.

6. The wireless station of claim 5, wherein the capabilities comprise one or more of:
Wi-Fi bands the peer station can communicate on;
channels the peer station can communicate on; or
rates at which the peer station is capable of communicating.

7. The wireless station of claim 1, wherein the at least one processor is further configured to:
transmit, at the local time of the wireless station, a second message to the peer station, wherein the second message includes information regarding a record the wireless station has published, wherein the record indicates a service published by the wireless station.

8. A non-transitory computer readable memory medium storing program instructions executable by a processor of a wireless station to:
receive a message from a peer station via Wi-Fi peer-to-peer communication, wherein the message includes a first timestamp value indicating time of transmission of the first message and an availability time for peer-to-peer communications, wherein the first timestamp value and the availability time are based on a clock of the peer station;

associate, to the message, a second timestamp value indicating time of receipt of the message, wherein the second timestamp value is based on a local clock of the wireless station; and transmit a response message at a time correlating to the availability time of the peer station, wherein the time is correlated based on comparison of the first and second timestamp values, wherein the response message includes a third timestamp value indicating time of transmission of the response message and a second availability time for communications, wherein the third timestamp and the second availability time are based on the local clock.

9. The non-transitory memory medium of claim 8, wherein the message includes a data structure indicating future times and channels the peer station will be listening, wherein the future times are based on the clock of the peer station.

10. The non-transitory memory medium of claim 8, wherein the response message further includes a data structure indicating future times and channels the wireless station will be listening, wherein the future times are based on the local clock.

11. The non-transitory memory medium of claim 8, wherein the message includes a data structure that indicates capabilities of the peer station.

12. The non-transitory memory medium of claim 11, wherein the capabilities comprise one or more of:
Wi-Fi bands the peer station can communicate on;
channels the peer station can communicate on; or
rates at which the peer station is capable of communicating.

13. The non-transitory memory medium of claim 8, wherein the response message further includes information regarding a record the wireless station has published, wherein the record indicates a service published by the wireless station.

14. An apparatus, comprising:
a memory; and
at least one processor in communication with the memory, wherein the at least one processor is configured to:
generate instructions to transmit a message to a peer station via Wi-Fi peer-to-peer communication, wherein the message includes a first timestamp value and a first availability time for peer-to-peer communications, wherein the first time stamp value indicates time of transmission of the message, wherein the first timestamp value and the second availability time are based on a local clock associated with the apparatus;

receive a response message from the peer station via Wi-Fi communication, wherein the response message includes a second timestamp value and a second availability time for peer-to-peer communications, wherein the second time stamp value indicates time of transmission of the response message, wherein the second timestamp value and the second availability time are based on a clock the peer station;

associate, to the response message, a third timestamp value indicating time of receipt of the response message, wherein the third timestamp value is based on the local clock; and determine, based on comparison of the second and third timestamp values, a local time that correlates to the second availability time.

15. The apparatus of claim 14, wherein the response message further includes a data structure indicating future times and channels the peer station will be listening, wherein the future times are based on the clock of the peer station.

16. The apparatus of claim 15, wherein the response message includes a data structure that indicates capabilities of the peer station.

17. The apparatus of claim 16,
wherein the capabilities comprise one or more of:
  Wi-Fi bands the peer station can communicate on;
  channels the peer station can communicate on; or
  rates at which the peer station is capable of communicating.
18. The apparatus of claim 14,
wherein the response message further includes information regarding a record the peer station has published, wherein the record indicates a service published by the peer station.
19. The apparatus of claim 14,
wherein the availability time comprises channels and future times for peer-to-peer communications.
20. The apparatus of claim 14,
wherein the response message is transmitted on a different channel than the message was received.

* * * * *